US 6,477,942 B1

(12) United States Patent
Guu

(10) Patent No.: US 6,477,942 B1
(45) Date of Patent: Nov. 12, 2002

(54) BEVERAGE INFUSION CONTAINER

(76) Inventor: Chuen Lan Guu, No. 15, Hsi An Lane, Pu-Li Chen, Nan-Tou Hsien (TW)

( * ) Notice: Subject to any disclaimer, the term of this patent is extended or adjusted under 35 U.S.C. 154(b) by 0 days.

(21) Appl. No.: 10/153,781

(22) Filed: May 24, 2002

(51) Int. Cl.[7] .............................. A23L 1/00; A47J 31/02
(52) U.S. Cl. ............................. 99/285; 99/297; 99/299; 99/306; 99/323; 99/495
(58) Field of Search .................... 99/495, 452, 453, 99/285, 299, 297, 304–306, 317, 319, 279, 323, 323.3; 210/474, 477–479, 181; 426/433, 435, 432, 429

(56) References Cited

U.S. PATENT DOCUMENTS

| | | | | | |
|---|---|---|---|---|---|
| 3,631,793 A | * | 1/1972 | Bednartz | ..................... | 99/295 |
| 3,724,359 A | * | 4/1973 | Masters et al. | ................ | 99/281 |
| 5,125,327 A | * | 6/1992 | Winnington-Ingram | ...... | 99/306 |
| 5,632,193 A | * | 5/1997 | Shen | ............................ | 99/285 |
| 5,632,194 A | * | 5/1997 | Lin | .............................. | 99/285 |
| 5,813,317 A | * | 9/1998 | Chang | ........................ | 99/285 |
| 5,913,964 A | * | 6/1999 | Melton | ........................ | 99/322 |
| 5,924,354 A | * | 7/1999 | Court et al. | .................. | 99/318 |
| 5,943,946 A | * | 8/1999 | Chen | ........................... | 99/297 |
| 5,947,004 A | * | 9/1999 | Huang | ......................... | 99/299 |
| 6,164,190 A | * | 12/2000 | Tien Lin | ...................... | 99/299 |
| 6,279,460 B1 | * | 8/2001 | Pope | ........................... | 99/299 |
| 6,327,965 B1 | * | 12/2001 | Lin Tien | ....................... | 99/299 |

* cited by examiner

Primary Examiner—Timothy F. Simone
(74) Attorney, Agent, or Firm—Rosenberg, Klein & Lee

(57) ABSTRACT

A beverage infusion container including a partitioning board transversely disposed in the container to divide the interior of the container into a first division and a second division each having an opening. The partitioning board is formed with a central draining hole. The blocking/unblocking of the draining hole is controlled by a controlling mechanism. A mesh rack is disposed on one side of the partitioning board in the first division. A communicating tube is formed on the partitioning board adjacent to the circumferential wall of the container for communicating the first division with the second division. The mesh rack is formed with a ventilating tube corresponding to the draining hole of the partitioning board. The ventilating tube extends toward the opening of the first division. The communicating tube and the ventilating tube serve as two air flow ways for convection of the air between the first and second divisions.

3 Claims, 7 Drawing Sheets

BEVERAGE INFUSION CONTAINER

BACKGROUND OF THE INVENTION

The present invention is related to a beverage infusion container having two divisions. The two divisions are respectively designed with communicating tube and ventilating tube for easy convection of the air and liquid respectively contained in the two divisions.

FIGS. 5 and 6 show a conventional tea infusion cup 7. A partitioning board 71 is disposed in the tea infusion cup 7 to divide the interior of the cup into a first division 78 and a second division 79. The first and second divisions 78, 79 respectively have two covers 77a, 77b. The partitioning board 71 is formed with a central draining hole 711 communicating the first and second divisions 78, 79 with each other.

A mesh rack 72 is disposed above the partitioning board 71. A filtering mesh 721 is paved over the mesh rack 72. The center of the mesh rack 72 has an upward extending tube 73 in which a pull rod 74 is fitted. The top end of the pull rod 74 extends out of the tube 73 and is formed with a holding section 741. The bottom end of the pull rod 74 downward extends out of the tube 73 and is fitted with a spring 75. A valve body 76 is connected with the bottom end of the pull rod 74. In normal state, the valve body 76 is pushed downward by the spring 75 to block the draining hole 711.

In use, the tea is placed into the first division 78 and infused with hot water. After a period of time, the holding section 741 is pinched to pull up the pull rod 74. At this time, a locating plate 742 of the pull rod 74 is separated from a locating slot 731 of top end of the tube 73. Then the pull rod 74 can be turned to move the locating plate 742 to a locating notch 732.

When the pull rod 74 is pulled upward, the valve body 76 is moved upward to compress the spring 75 and unblock the draining hole 711. Under such circumstance, the tea in the first division 78 is permitted to flow through the draining hole 711 into the second division 79. Then, the user can turn the pull rod 74 to make the valve body 76 again block the draining hole 711. Thereafter, the cover 77a is closed and the cup 7 is turned upside down. Then, the other cover 77b is opened for drinking the made tea.

However, when the tea flows from the first division 78 into the second division 79, the air in the second division 79 must be exhausted therefrom. The filtering mesh 721 is formed with multiple fine meshes. Due to the surface tension of the tea water, the fine meshes will be blocked by the tea water so that the air can not pass through the filtering mesh 721 into the first division 78. In addition, the gap between the pull rod 74 and the inner face of the tube 73 is very small so that the air in the second division 79 can hardly pass through the gap to leave the second division 79. Therefore, the tea cannot flow down into the second division 79.

In order to allow the tea water to flow into the second division 79, the user must again close the upper cover 77a and then tilt the cup 7 to a state in which the filtering mesh 721 is not totally sunk in the tea water. Under such circumstance, the air in the second division 79 can pass through the emerged part of the filtering mesh 721 into the first division 78. At this time, the tea water 78 is allowed to flow from the first division 78 into the second division 79. However, the draining hole 711 is positioned at the center of the partitioning board 71. Therefore, after the tea water gradually flows from the first division 78 into the second division 79, the water level in the first division 78 will descend to a height lower than the draining hole 711. At this time, it is necessary to gradually turn the cup 7 to an upright position to keep the level in the first division 78 higher than the draining hole 711 so that the tea water can flow from the first division 78 into the second division 79. Such operation is quite troublesome.

SUMMARY OF THE INVENTION

It is therefore a primary object of the present invention to provide a beverage infusion container in which the tea water in the first division can smoothly flow into the second division. A communicating tube is formed on the partitioning board adjacent to the circumferential wall of the container for communicating the first division with the second division. The mesh rack is formed with a ventilating tube corresponding to the draining hole of the partitioning board. The ventilating tube extends toward the opening of the first division. The communicating tube and the ventilating tube serve as two air flow ways for convection of the air between the first and second divisions. Therefore, the tea water in the first division can more smoothly flow into the second division. In addition, multiple downward extending posts are arranged under the bottom face of the mesh rack. The posts serve to destruct the surface tension of the tea water on the bottom face of the filtering mesh. Therefore, the tea water in the first division can more easily flow down into the second division.

The present invention can be best understood through the following description and accompanying drawings wherein:

DETAILED DESCRIPTION OF THE PREFERRED EMBODIMENT

Figure 1:
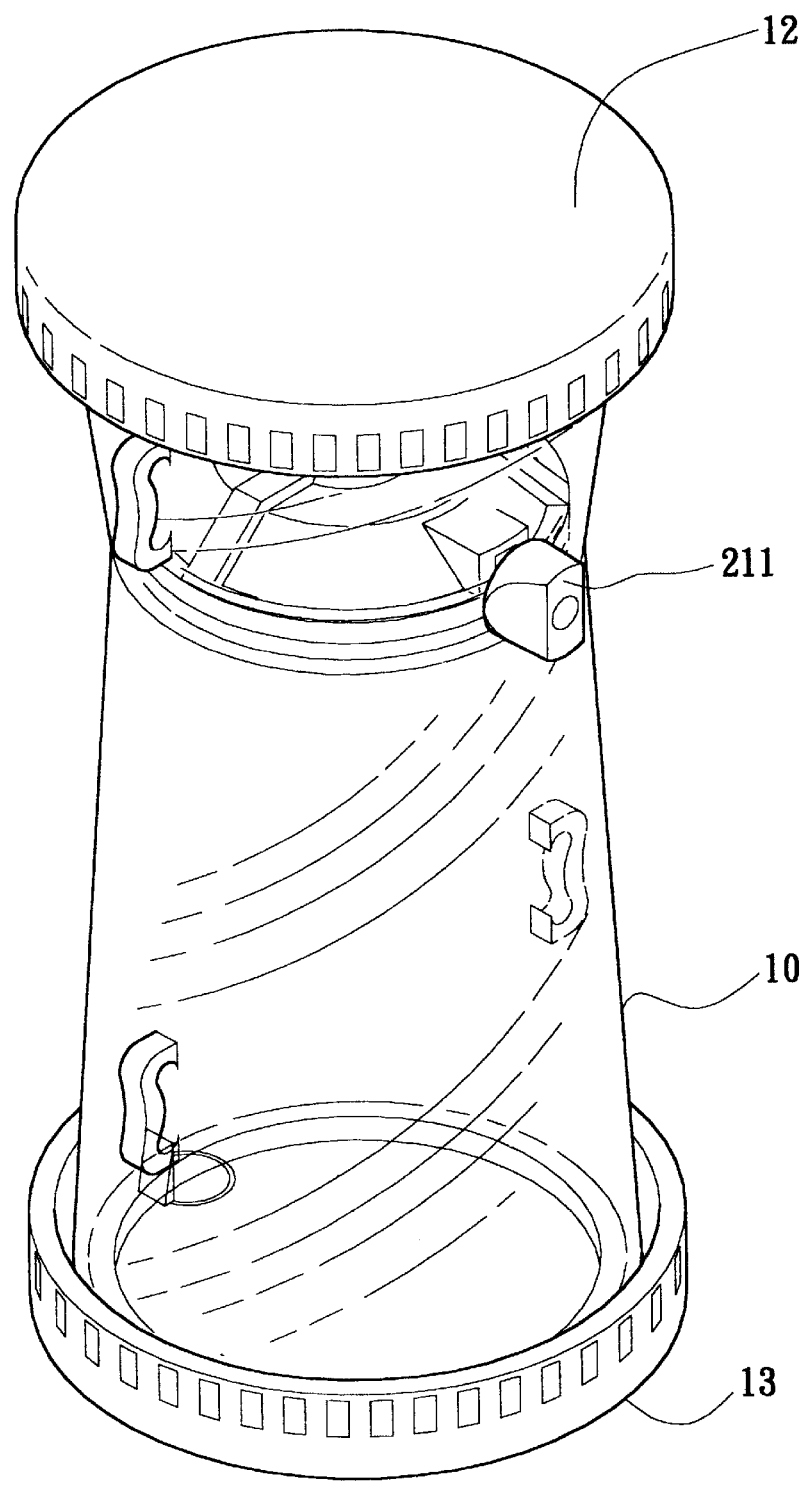
FIG. 1 is a perspective assembled view of the present invention.
Figures 2A, 2B:
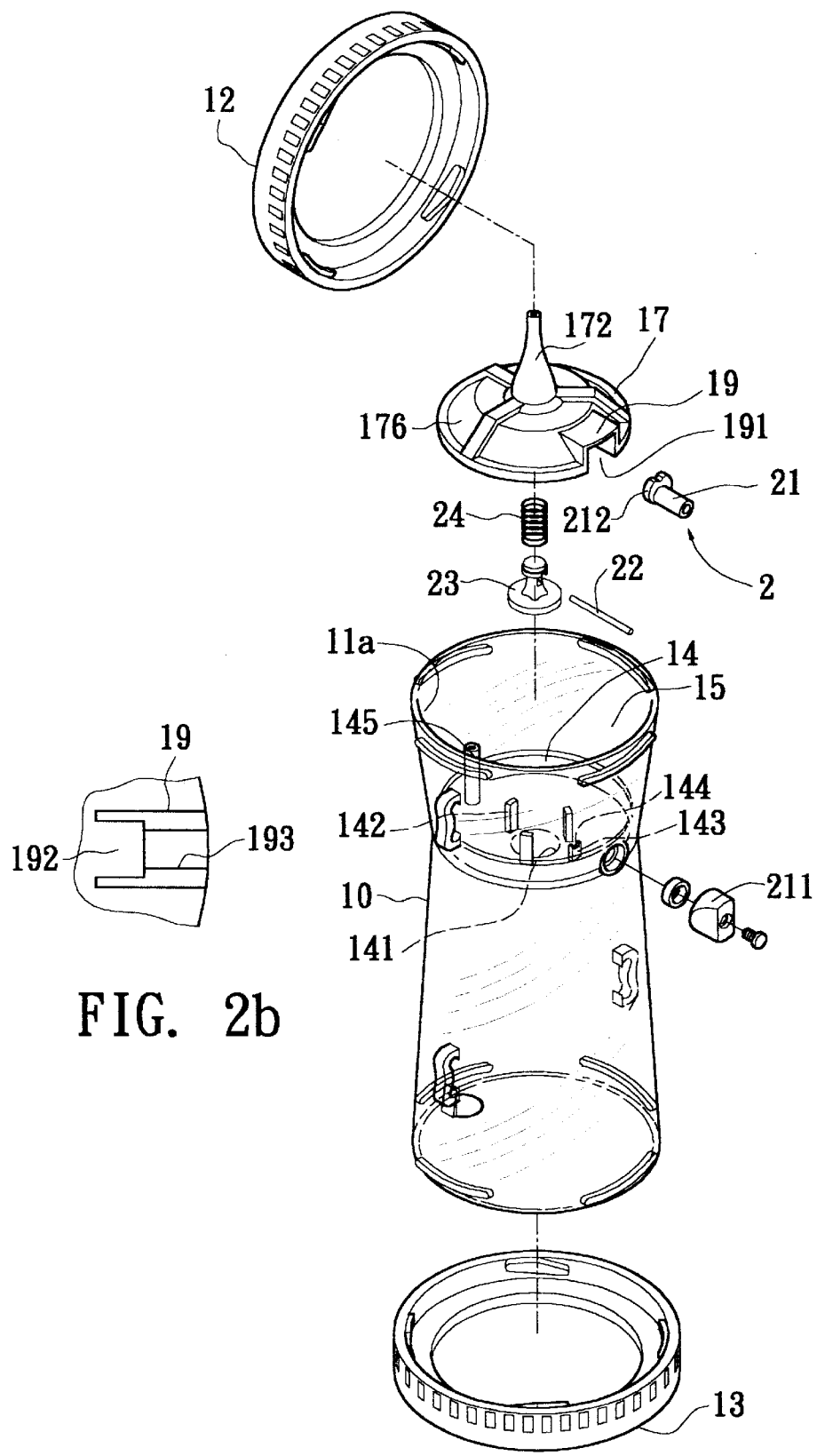
FIG. 2a is a perspective exploded view of the present invention.
FIG. 2b shows the block body of the mesh rack of the present invention.
Figure 3:
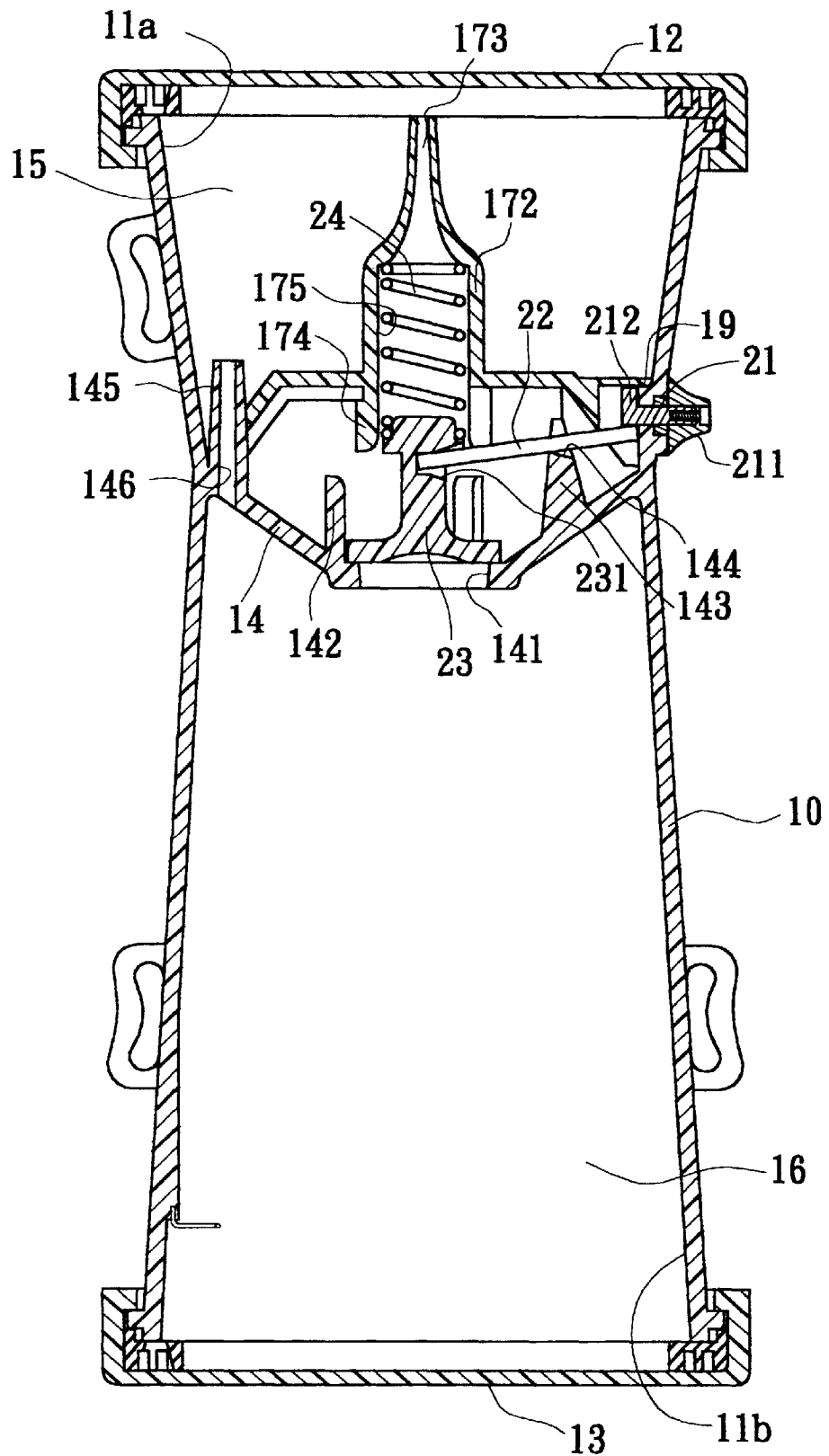
FIG. 3 is a sectional view of the present invention.
Figure 4A:
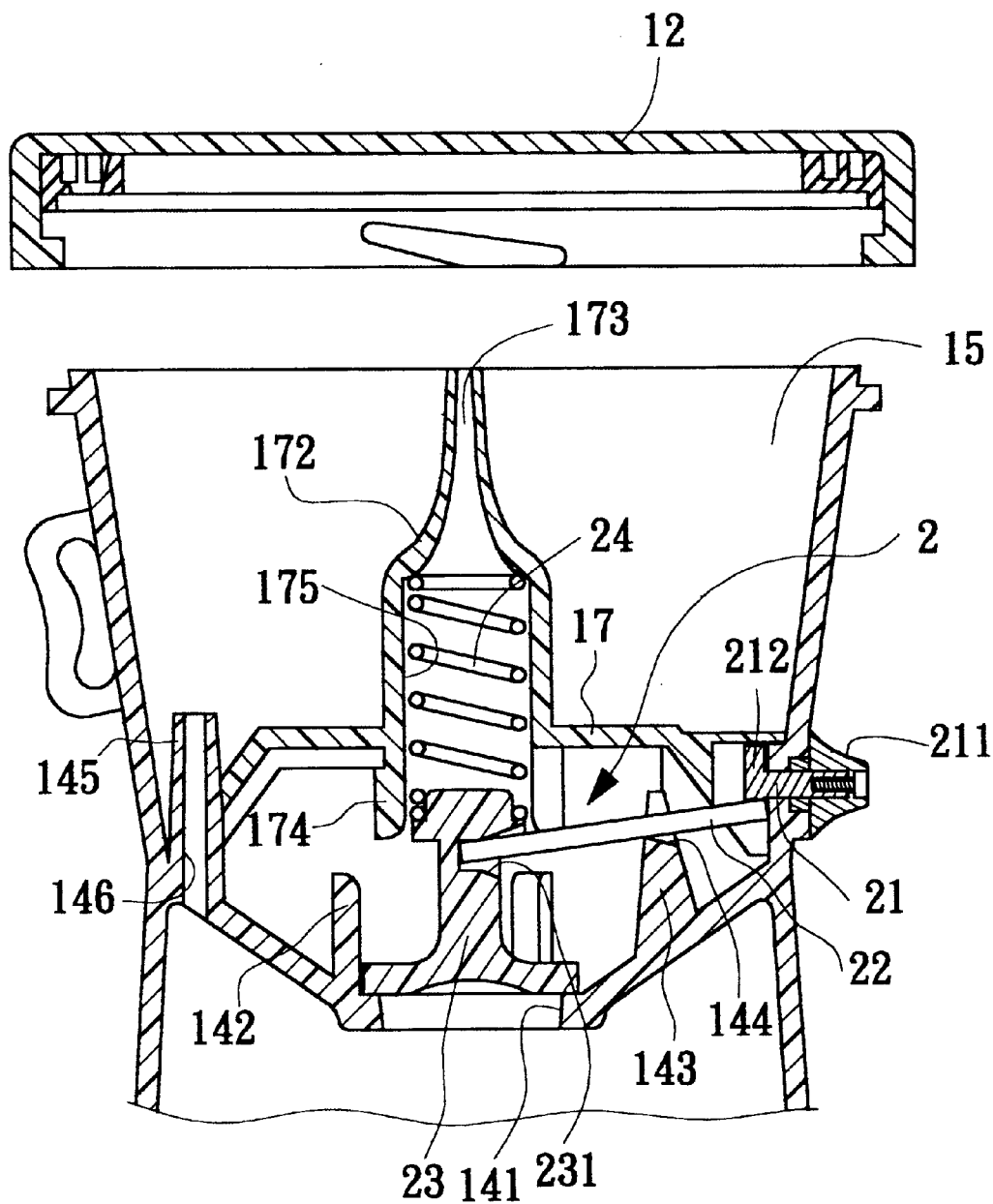
FIG. 4a shows that the draining hole of the partitioning board is blocked by the valve body of the present invention in a normal state.
Figure 4B:
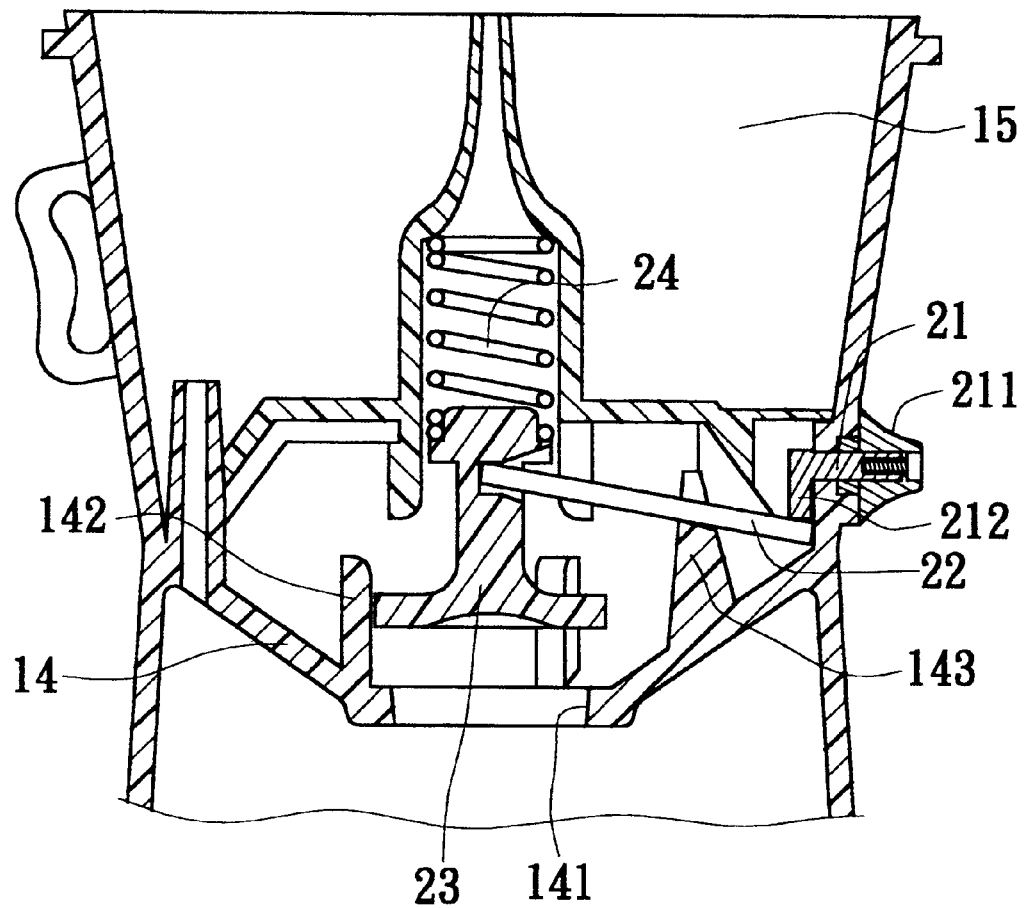
FIG. 4b shows that the rotary button is turned to lift the valve body so as to unblock the draining hole of the present invention.
Figure 5:
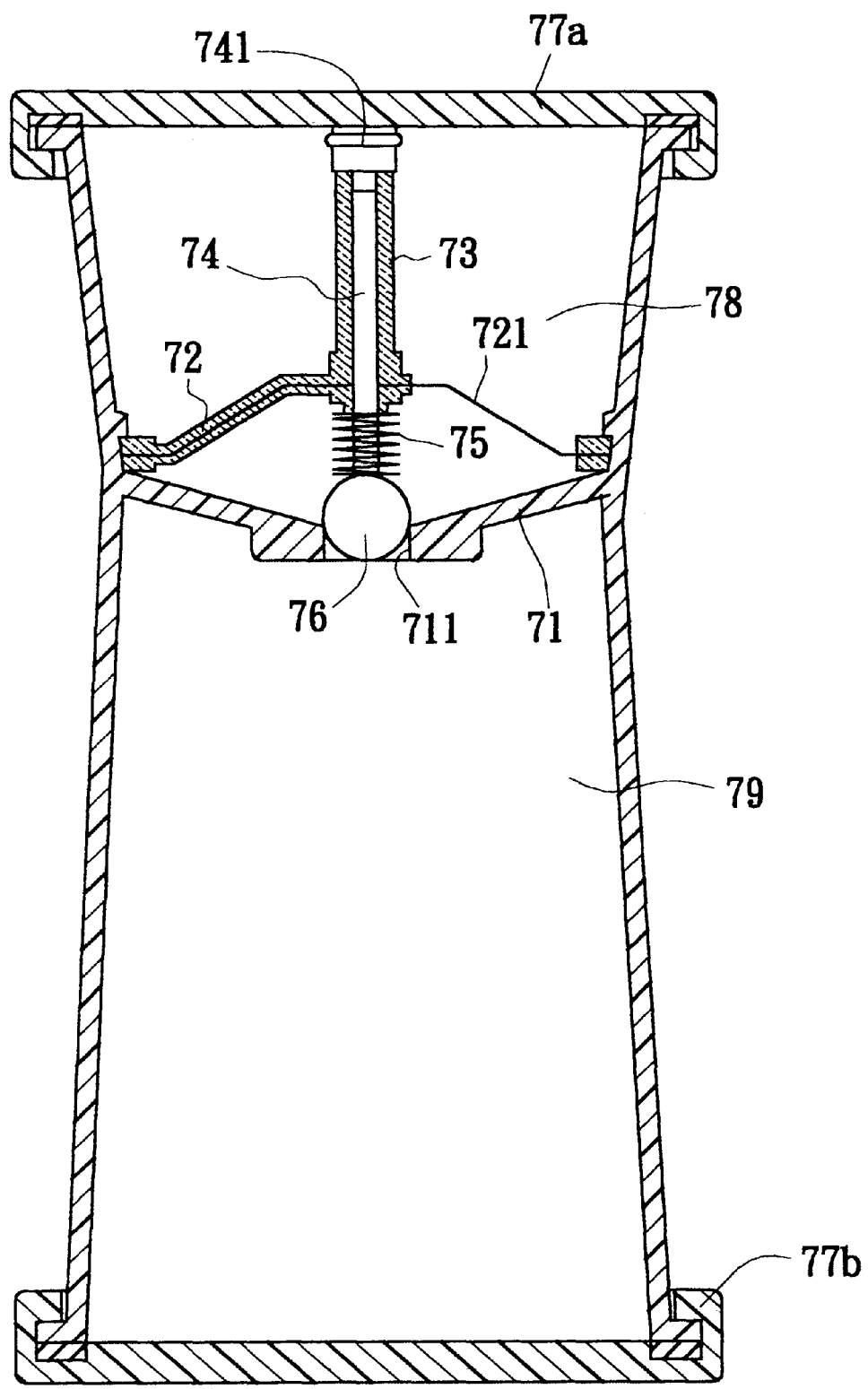
FIG. 5 shows a conventional tea infusion cup.
Figure 6:
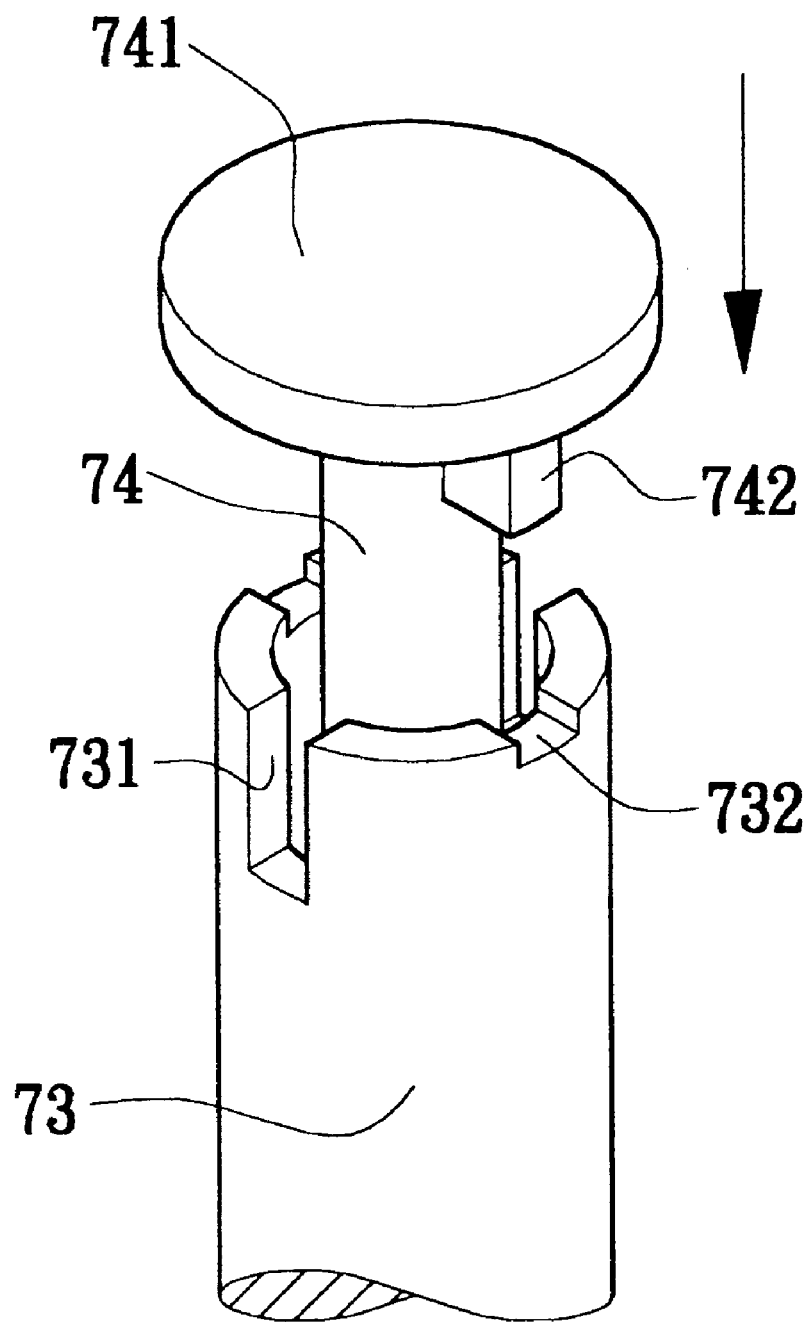
FIG. 6 is a perspective view showing the top end of the tube and the top end of the pull rod of the conventional tea infusion of FIG. 5.

Please refer to FIGS. 1 to 4. The beverage infusion container of the present invention includes a circumferential wall 10 and has an upper opening 11a and a lower opening 11b. An upper cover 12 and a lower cover 13 are respectively screwed on the upper and lower openings.

A partitioning board 14 is transversely disposed in the container to divide the interior of the container into an upper first division 15 and a lower second division 116. The center of the partitioning board 14 is formed with a draining hole 141. A projecting support block 143 is formed on the partitioning board 14 in the first division 15 near the circumferential wall 10 of the container. The top end of the support block 143 is formed with a notch 144. A communicating tube 145 is formed on the partitioning board 14 radially opposite to the support block 143. The communicating tube 145 extends into the first division 15 and is formed with a tunnel 146 communicating the first division 15 with the second division 16. In addition, the partitioning board 14 is formed with multiple abutting plates 142 arranged along the circumference of the draining hole 141. The abutting plates 142 vertically extend into the first division 15.

A mesh rack 17 is disposed in the first division 15 over which a filtering mesh 176 is paved. The center of the mesh rack 17 is formed with an upward extending ventilating tube 172 corresponding to the draining hole 141. In this embodiment, the top section of the ventilating tube 172 is upward tapered into a substantially conic shape. Accordingly, the top section of the ventilating tube defines therein a small diameter passage 173, while the bottom section thereof defines a large diameter passage 175. Multiple downward extending posts 174 are annularly arranged at equal intervals along the circumference of the bottom of the large diameter passage 175.

The mesh rack 17 is formed with a block body 19 adjacent to the inner face of the container. The block body 19 has a hollow section 191 radially passing through the mesh rack 17 and open to lower side. The hollow section 191 and the support block 143 are up and down opposite to each other. The hollow section 191 has a wider section 192 on one side near the draining hole 141 of the partitioning board. The wider section 192 is adapted to accommodate the support block 143 therein. One side of the hollow section 191 near the inner face of the container is formed with a narrower section 193.

The blocking/unblocking of the draining hole 141 is controlled by a controlling mechanism 2. The controlling mechanism 2 includes a rotary member 21, a link 22, a valve body 23 disposed at a rear end of the link 22 and a spring 24.

The rotary member 21 is rotatably disposed on the circumferential wall 10. One end of the rotary member 21 extending out of the circumferential wall 10 is connected with a rotary button 211. The other end of the rotary member 21 has a radially projecting press block 212. When turning the rotary button 211, the press block 212 is rotated to press the link 22 so as to lift the valve body 23 for unblocking the draining hole 141.

The link 22 is passed through the notch 144 of the support block 143 of the partitioning board and supported on the support block 143. A front end of the link 22 opposite to the valve body 23 is snugly fitted in the narrower section 193 of the block body. The valve body 23 is positioned between the abutting plates 142 for blocking the draining hole 141. The valve body 23 is formed with a socket 231 in which the rear end of the link 22 is inserted.

The spring 24 is accommodated in the large diameter passage 175 of the ventilating tube above the valve body 23. In normal state, the spring 24 downward pushes the valve body 23 to block the draining hole 141.

In use, the tea is placed onto the filtering mesh 176 in the first division 15 and infused with hot water. After a period of time of infusion, the rotary button 211 is turned to make the press block 212 depress the link 22 and engage with the link 22. At this time, the valve body 23 is kept lifted and the draining hole 141 is kept unblocked.

Under such circumstance, the tea water in the first division 15 will flow down due to its own weight. The tunnel 146 of the communicating tube 145 and the ventilating tube 172 serve as two air flow ways for convection of the air. Therefore, the air in the second division 16 can flow into the first division 15. Accordingly, the tea water in the first division 15 can easily flow through the draining hole 141 into the second division 16. Under such circulation, the beverage in the first division 15 can smoothly flow into the second division 16. The tea remainder is hindered by the filtering mesh 176 and remains in the first division 15.

Then, the upper cover 12 is closed and the container is turned upside down. Then the lower cover 13 is opened for drinking the beverage in the second division 16.

According to the above arrangement, the present invention has the following advantages:

1. The ventilating tube 172 disposed on the mesh rack 17 and the communicating tube 145 disposed on the partitioning board 14 serve as two air flow ways for convection of the air. Therefore, the air in the second division 16 can flow upward from the second division 16 through the tunnel 146 of the communicating tube 145 into the first division 15. Accordingly, the tea water in the first division 15 can more smoothly flow down through the draining hole 141 into the second division 16.

2. Multiple downward extending posts 174 are arranged along the circumference of the bottom of the ventilating tube 172. The posts 174 serve to destruct the surface tension of the tea water on the filtering mesh 176. Therefore, the tea water in the first division 15 can easily pass through the filtering mesh 176 and flow down into the second division 16.

The above embodiment is only used to illustrate the present invention, not intended to limit the scope thereof. Many modifications of the above embodiment can be made without departing from the spirit of the present invention.

What is claimed is:

1. A beverage infusion container having a circumferential wall, said container comprising:

a partitioning board transversely disposed in the container to divide an interior of the container into a first division and a second division, each of the divisions having an opening provided with a cover, the partitioning board being formed with a draining hole, the blocking/unblocking of the draining hole being controlled by a controlling mechanism; and a mesh rack disposed on one side of the partitioning board in the first division, said container being characterized in that:

a communicating tube is formed on the partitioning board adjacent to the circumferential wall of the container, the communicating tube extending toward the opening of the first division to communicate the first division with the second division; and the mesh rack is formed with a ventilating tube corresponding to the draining hole of the partitioning board, the ventilating tube extending toward the opening of the first division, whereby the communicating tube and the ventilating tube serve as two air flow ways for convection of the air between the first and second divisions.

2. The beverage infusion container as claimed in claim 1, wherein a section of the ventilating tube proximal to the mesh rack defines a large diameter passage, while another section of the ventilating tube distal from the mesh rack defines a small diameter passage, the small diameter passage of the ventilating tube being tapered from one end adjacent to the large diameter passage to the other end.

3. The beverage infusion container as claimed in claim 1, wherein multiple posts are annularly arranged under the ventilating tube and extending toward the second division.

* * * * *